Dec. 16, 1941.                    W. D. HALL                    2,266,624
                                 HOOK-ON METER
            Filed March 18, 1939                    2 Sheets-Sheet 1
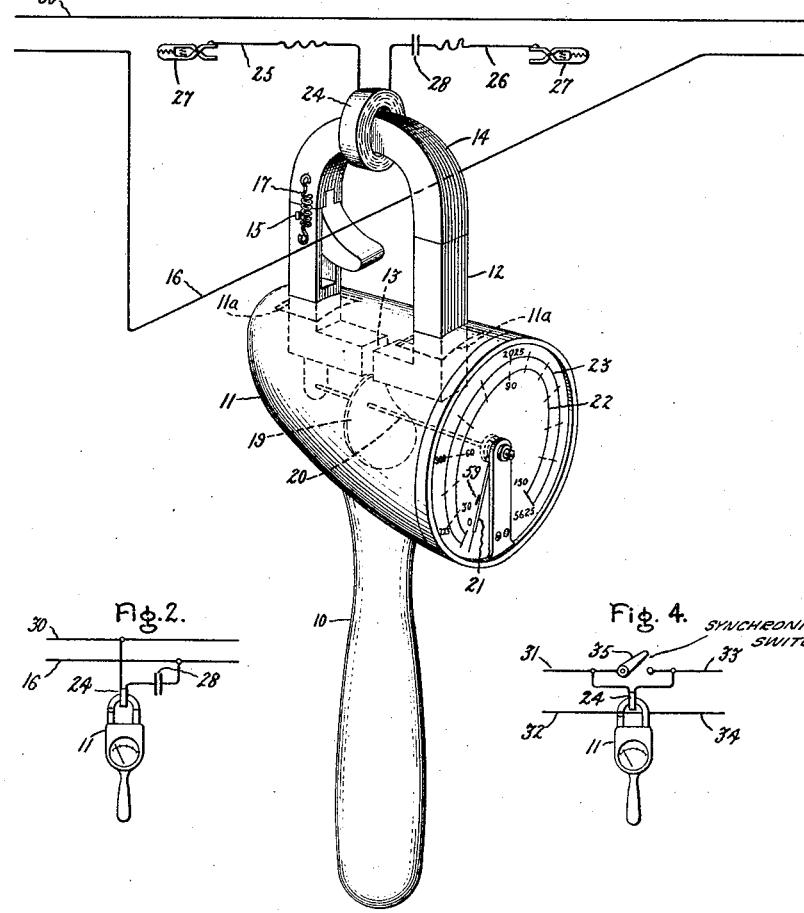
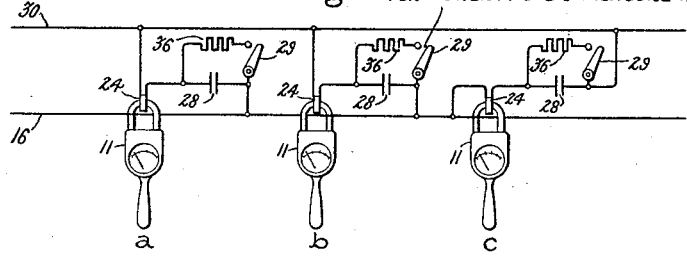
Inventor:
William D Hall,
by Harry E. Dunham
His Attorney.

Dec. 16, 1941.  W. D. HALL  2,266,624
HOOK-ON METER
Filed March 18, 1939  2 Sheets-Sheet 2
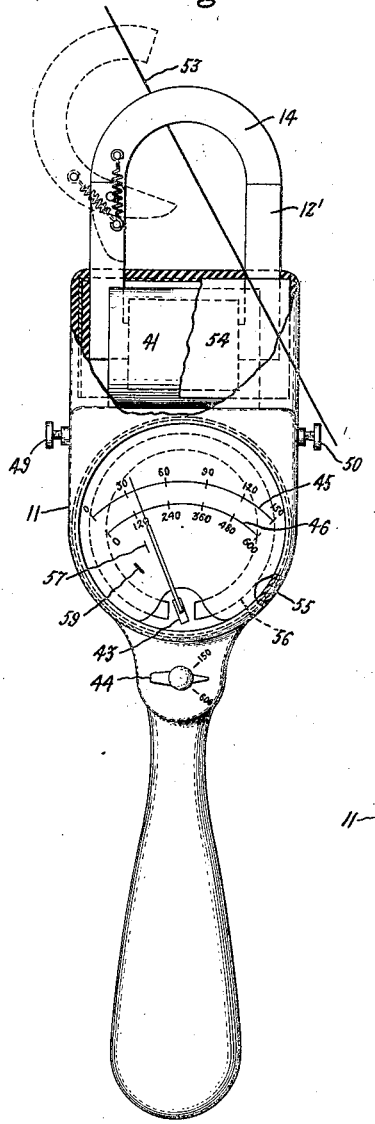
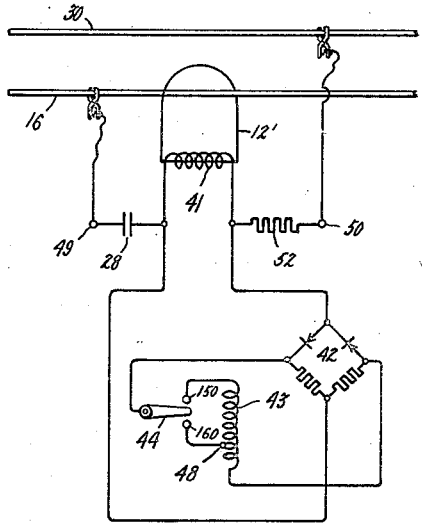
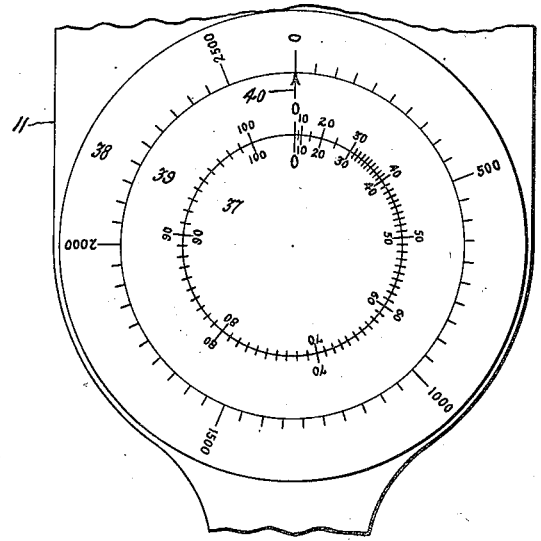
Inventor:
William D. Hall,
by Harry E. Dunham
His Attorney.

Patented Dec. 16, 1941

2,266,624

UNITED STATES PATENT OFFICE 2,266,624

HOOK-ON METER

William D. Hall, Lynn, Mass., assignor to General Electric Company, a corporation of New York Application March 18, 1939, Serial No. 262,767

12 Claims. (Cl. 171—95)

My invention relates to that type of electrical measuring apparatus which is adapted to be connected in measuring relation with a current carrying conductor without cutting or otherwise disturbing the conductor. Generally, such apparatus has a magnetic yoke which can be opened, hooked over the conductor, and closed thereover for current measuring purposes and has often been referred to as the hook-on ammeter. The object of my invention is to improve the accuracy and extend the field of usefulness of this type device. An important feature of my invention pertains to proper magnetic shielding of the measuring apparatus. Another feature extends the use of the apparatus to measure other electrical quantities in addition to amperes and in this connection a calibration scheme by means of which both amperes and volts, for example, may be read directly on the same scale. Watts and power factor may be readily determined by the use of my invention. Other features of my invention will appear as the description proceeds.

Those features of my invention which are believed to be novel and patentable will be pointed out in the claims appended hereto. For a better understanding of my invention, reference is made in the following description to the accompanying drawings in which Fig. 1 represents a hook-on ammeter including a voltage measuring coil and a scale calibration from which watts and power factor may be determined; Fig. 2 represents the use of the apparatus for measuring volts; Fig. 3 represents the use of the apparatus for measuring watts and determining power factor; Fig. 4 represents the use of the apparatus as a synchroscope; Fig. 5 represents a slide rule which may be used to take the place of a watt scale on the instrument, such slide rule when used being preferably mounted on the back side of the hook-on ammeter as indicated; Fig. 6 is a front view of a multiple range hook-on ammeter illustrating a magnetic shielding arrangement; and Fig. 7 is a wiring diagram for the multiple range device of Fig. 6.

Referring now to Fig. 1, I have here represented a hook-on ammeter of the general character described in U. S. Patent 2,146,555, February 7, 1939, to Arey and assigned to the same assignee as the present invention and having all of the advantages thereof, and including certain improvement features of my invention. 10 represents an insulating handle which is integral with a suitable supporting casing structure 11 also of insulating material. Such casing structure supports a magnetic core structure 12 containing an armature air gap at 13 within the casing and a section 14 hinged at 15 external to and above the casing. The hinged portion 14 may be opened for the purpose of hooking the core over a cable 16 and closed again as illustrated for current measuring purposes. The spring shown at 17 serves to produce a toggle action when the core is opened and closed to hold the part 14 firmly in either the open or closed position.

The measuring instrument shown is of the iron vane armature type, the armature vane being indicated at 19, the shaft at 20 and the pointer at 21. Further details of such an instrument are described in the Arey patent above mentioned. The pointer is behind a glass window covering one end of the casing and cooperates with inner and outer scales 22 and 23. Current or amperes are measured on the inner scale 22 in the usual manner when the core is closed over a current carrying conductor as illustrated in Fig. 1.

Shown on the hinged part of core 14 is a voltage coil 24. This coil may be so dimensioned that it may be readily slipped on and off of core part 14 or core part 12 when the core is in the open position. Also it may be permanently fastened in place on core 12. Coil 24 is not used when making current measurements but it may remain on core part 14 when making current measurements if it is open circuited, as shown in Fig. 1. Coil 24 is provided with suitable leads 25 and 26 having clips 27 for connection across the points of voltage measurement. For high accuracy under certain conditions the voltage circuit may contain a condenser 28 but for most voltage measurements this is not essential.

An important novel feature of my voltage coil improvement is that the impedance of the voltage coil circuit is made equal to the number of turns in the coil in order that current and voltage may be read on the same scale 22 directly without any correction factor. When used as an ammeter the flux in the armature air gap is proportional to ampere turns. Thus in Fig. 1, if 50 amperes are flowing in conductor 16, its one turn link with core 12 produces a flux equivalent to 50 ampere turns in gap 13 and pointer 21 will indicate 50 on scale 22, if the instrument is properly calibrated. When measuring voltage, the apparatus is connected as represented in Fig. 2, across the circuit 16—30, either with or without condenser 28 included. Let us assume first that the condenser is not used. The reading of pointer 21 is equal to the ampere turns of coil 24. If, for example, it has 100 turns and has an impedance of one ohm per turn or 100 ohms, the current flow there-through on 50 volts will be $^{50}/_{100}$ or ½ ampere, and the ampere turns will be ½ × 100 or 50, and hence will indicate 50 on scale 22. It is thus seen that by making the impedance of coil 24 equal to its number of turns, current and voltage may be read on the same scale 22. In practice I find it advantageous to provide a voltage coil 24 of 15,000 turns, in which case the impedance of the voltage coil circuit will be 15,000 ohms and in this case on 50 volts the current will be $^{50}/_{15,000} = ^{1}/_{300}$ ampere and will produce $^{1}/_{300} \times 15,000 = 50$ ampere turns, and hence produce a reading of 50 on ampere scale 22. Or, in other words, the ampere turns of winding coil 24 are such as to equal the voltage measured. This voltage winding might be divided into two coils connected in parallel, in which case the impedance per coil would be twice the turns per coil, but the ampere turns of the complete voltage winding would remain equal to the total impedance, and where in the claims I refer to a voltage winding circuit having a number of turns equal to its impedance, I mean to include such an equivalent as has just been mentioned.

I have found that in some cases the inductance of coil 24 on core part 14 varies slightly at different voltages. This may produce an error up to 2%. If, however, I employ a small condenser 28 which resonates with the coil or in other words which has a capacitive reactance equal to the inductive reactance of coil 24, the inductance factor is eliminated and the error is eliminated. Using such a condenser the 15,000 turn coil 24 is wound for 15,000 ohms resistance in its circuit.

In addition to simplifying voltage measurements, the use of a voltage winding having a resistance equal to its number of turns facilitates the use of the apparatus for the measurement of watts because the current and voltage vector components being to the same scale can be combined for watt measurement purposes as will now be explained.

In Fig. 3, the apparatus $a$ is connected to measure the vector sum of the current in cable 16 and the voltage across circuit 16—30. Representing the current component by I and the voltage component by E and the phase angle between them by $\phi$, the vector sum equals $$\sqrt{I^2 + E^2 + 2EI \cos \phi}$$

In Fig. 3 at $b$, the voltage connection is the same but the cable 16 is passed through the magnetic yoke in the opposite direction. In this case the current and voltage components may be considered as being subtracted by measurement and hence measurement $b$ equals $$\sqrt{I^2 + E^2 - 2EI \cos \phi}$$

Subtracting the square of these two measurements gives us $a^2 - b^2 = 4EI \cos \phi$. $EI \cos \phi$ equals watts which equals $\frac{1}{4}a^2 - \frac{1}{4}b^2$. Hence if I take one-fourth of the square of the measurement on scale 22, when read as in Fig. 3 at $b$, and subtract it from one-fourth of the square of the measurement made on scale 22, when read as in Fig. 3 at $a$, I obtain watts. It is simpler, however, to provide an outer scale 23, Fig. 1, which is one-fourth of the square of scale 22 and then the difference of the two readings on scale 23 is equal to the watts. Hence a scale 23 is provided which is one-fourth of the square of the readings on scale 22. Thus "60" on scale 22 becomes $$(60)^2/4 = 3600/4 = "900"$$

on scale 23.

To measure watts, then, the operator takes readings on scale 23 with the apparatus connected as at $a$ and $b$ in Fig. 3 and simply subtracts the readings.

Instead of reversing the current winding, the voltage winding may be reversed for one of the readings. This is shown in Fig. 3 at $a$ and $c$. Subtracting the readings of scale 23 obtained with these connections will also give watts. There is a slight preference for the last procedure only when the current in amperes exceeds the voltage in volts. Since the resonant point of circuit 25, 26 is rather broad, I find it preferable to determine the correct size for condenser 28 by trying several sizes until finally a size is obtained which gives accurate watt readings at both unity and at 50% power factor.

Since voltage, current and watts are obtainable, the power factor is likewise obtainable. Illustrating such use of the apparatus, let it be assumed that a current measurement is taken, the connection being as in Fig. 1, and a reading of "30" amperes is obtained on scale 22. A voltage measurement is then taken, using the connection shown in Fig. 2, preferably with switch 29 open, and a reading of 110 volts on scale 22 is obtained. Then a reading of 4900 is obtained on scale 23 using the connection of Fig. 3 at $a$, and a reading of 1600 is obtained on scale 23 using the connection of Fig. 3 at $b$. The current is 30 amperes, the voltage 110 and the watts $4900 - 1600 = 3300$. The power factor is in this case unity since $EI \cos \phi$ equals 3300 when $\cos \phi$ equals 1. If the $a$ and $b$ readings had been 4240 and 2260, giving 1980 watts, the power factor would have been $\cos \phi = 1980/3300 = 0.600$. It will be understood that this assumes that the power conditions remained steady between different measurements. For best accuracy under fluctuating load conditions it would be desirable to have several similar hook-on devices so that all of the measurements could be taken simultaneously. It will be evident, however, that with a single apparatus the different measurements may be taken in rapid succession as all of the connections are very simple and can be quickly changed.

In Fig. 4 I have illustrated the use of the apparatus as a synchroscope and synchronizing current surge indicator. Let it be assumed that the lines 31 and 32 are to be connected to the lines 33, 34 through the switch 35 which switch is located on the power station switchboard. Clips 27 are connected as shown with switch 35 open. No measureable current will flow through the connection 32, 34 until the circuit is completed by closing switch 35. Hence, the ammeter function of the device is dormant. However, if a voltage exists across switch 35 the device will measure such voltage, and as synchronism is approached the pointer will fluctuate from zero in accordance with twice the difference in frequency of the two systems until the switch can be closed when the indication is near zero and the fluctuations are very slow. At the instant the switch is closed the voltage across the switch becomes zero and appreciable surge synchronizing current may flow. This will be measured and indicated by the device functioning as an ammeter on the same scale.

In Fig. 3 I have shown a high resistance 36 in series with the switch 29 about the condenser 28. This is useful for quickly determining if the power factor is leading or lagging. Resistor 36 is of such value that at unity power factor the $a$ reading for example will not appreciably change when the switch 29 is closed. This is because a substantial phase shift at unity power factor has little effect on the reading. At appreciable leading or lagging power factors the difference in phase angle produced by the resistance has a large effect. If the power factor is leading, i. e. current is leading the voltage, including the resistance will decrease the $a$ reading noticeably because now the voltage current becomes still more lagging. This indicates leading power factor. However, if the reading increases when the resistance is thrown across the condenser, it indicates a lagging power factor. Thus the device may be used for this purpose by this very simple expedient. For watt measurement purposes the switch 29 should be open as the power factor of the voltage circuit has initially been adjusted by the condenser, as explained above.

In case it is not desirable to crowd the indicating scale with the watt scale 23, I may omit it from the front of the instrument and provide a circular slide rule for converting the readings obtained on scale 22 to watt readings. That is, the $a$ and $b$ readings of Fig. 3 may be made on scale 22 and then converted to watts by means of the slide rule. Such a slide rule is preferably mounted on the back of the instrument casing as indicated in Fig. 5. This slide rule has stationary inner and outer scale plates 37 and 38 and a movable intermediate scale plate 39. The adjacent graduations on scale plates 37 and 39 are similar and are according to the equation $y=x^2$. That is, the values of the various graduations are equal to the square of their clockwise angular displacement from the zero mark. An arrow 40 on movable member 39 gives indications on the outer stationary scale plate 38. The scale on plate 38 has equally spaced graduations and is equal to one-fourth of the square of the complementary numbers on scale 37. For example, the number 2500 on scale 38 is opposite 100 on scale 37 and is obtained as follows: $2500 = (100)^2/4$. The use of this slide rule is as follows: Suppose the Fig. 3$a$ reading on scale 22 (Fig. 1) is 90 and the Fig. 3$b$ reading on scale 22 (Fig. 1) is 50. The movable scale 39 is rotated clockwise until the graduation "50" thereon is opposite graduation "90" on scale 37. The arrow 40 will now point to 1400 on scale 38 which is the watt measurement. The slide rule is particularly useful when a multiple ratio instrument is used and there are a number of ampere or volt scales on the front of the instrument, as shown in Fig. 6.

While the hook-on apparatus of Fig. 1 may be used as an ammeter for either alternating currents or direct currents it is possible to obtain greater sensitivity if the vane 19 is composed of permanent magnet material and magnetized across its thickness. In this modification, the device is accurate only for direct current use. A suitable permanent magnet material is composed of 4% aluminum, 9% manganese, 87% silver; quenched from 800° C.; cold rolled; and annealed at 250° C. for three days, although any very high coercive force material will operate. For D. C. voltage measurements, a coil 24 may be provided whose ohmic resistance equals its effective turns.

To reduce errors occasioned by changes in the position of cable 16 inside the core 12, and the other errors, a shield 11$a$ is positioned inside of the casing 11. This shield is constructed of any high permeability, low hysteresis material and defines two large openings through which the core 12 passes into the casing. This shield otherwise comprises an inner lining for the casing and completely surrounds the instrument except at the window end.

Figs. 6 and 7 pertain to a multiple range hook-on meter embodying my invention. In this embodiment of the invention the core 12', instead of containing an air gap 13 for a magnetic vane or permanent magnet armature as represented in Fig. 1, is provided with a secondary transformer coil 41. This coil is connected through a rectifier bridge 42 to the moving coil 43 of a direct current instrument. A range-changing switch 44 is provided in the connection. In this case provision is made for two current-measuring ranges 150 and 600 amperes full scale and the instrument is provided with two scales 45, 46 for such ranges. The switch 44 has two operating positions, the upper position connecting the instrument ratio for the use of scale 45 and the lower position of switch 44 giving a ratio for use of lower scale 46. These positions of the switch are marked accordingly. The connections and circuit elements shown in Fig. 7 will be embodied within the casing structure 11 of Fig. 6 with the ratio changing switch operating handle 44 exposed as indicated. The circuit connections include a tap 48 on instrument coil 43 one-fourth the distance or number of turns from one end.

When switch 44 is thrown up on the "150" ratio point, current flows from winding 41 through the rectifier and the entire coil 43 of the instrument. When thrown to the "600" ratio point only one-fourth of the instrument coil is used and hence it requires four times the current to produce the same deflection as it did on the "150" range. Hence, if 150 amperes are flowing in primary conductor 16 to produce a full scale deflection on the "150" range scale 45, there will be 600 amperes flowing in conductor 16 to produce the same angular deflection on the "600" range scale 46. Other and additional ratios might be used by tapping the rectifier instrument across only a fraction of the secondary and the example is given only by way of illustration. A magnet 56 provides a flux to operate coil 43 as a D. C. milliammeter.

In the description of Fig. 1, I explained how a voltage measuring coil might be placed around core 14 for voltage measuring purposes. This also might be done with the apparatus of Figs. 6 and 7. However, it is unnecessary since we already have the coil 41 which may be used for this purpose.

To measure voltage with the apparatus of Figs. 6 and 7 I provide voltage terminals 49 and 50 to coil 41 and connect this coil across the line 16—30, preferably through the phase correcting condenser 28. In order to read volts on the ampere scales 45 and 46, I include a resistor 52 in the voltage connection, which resistor is so adjusted that with switch 44 connected for the 150 scale ratio, 150 volts across line 16—30 will produce a full scale deflection on scale 45. In other words a given current, for example 100 amperes, flowing in cable 16 when the device is connected for measuring current will give the same measurement current in the secondary as 100 volts applied to the voltage circuit will give when the apparatus is connected for measuring voltage. As in Fig. 1, the number of turns and impedance of the voltage circuit is such that it gives the same deflection of armature 43 per volt as the current winding gives per ampere and hence amperes and volts produce the same measurement response. The instrument ratio changing scheme obviously operates in the same way for current and voltage measurements. The apparatus as described will measure either volts or amperes from 0 to 600 on the same scales when properly connected for these measurements. When measuring current, the voltage circuit is opened and when measuring voltage the core is removed from about cable 16. When measuring voltages, coil 41 and its core act in some respects as an auto transformer and effect the same scale distribution for voltage measurements as for current measurements at all parts of the scale.

For measuring watts the same procedure as was used in Fig. 3 is followed. The vector summation of the $a$ and $b$ or $b$ and $c$ readings, Fig. 3, take place in the common transformer core 12' and produce a resultant voltage across coil 41 instead of a resultant flux in the air gap 13 of Fig. 1. The same kind of a watt scale might be used in Fig. 6 as in Fig. 1 but due to the confusion that might result from having so many scales, I prefer to use the slide rule arrangement of Fig. 5 mounted on the rear of casing 11 in Fig. 6. The other measurements explained in connection with the apparatus of Fig. 1 may be made with the apparatus of Fig. 6. While the slide rule is graduated on scales 37 and 39 to only "100," it is possible to use it for the full scale value of "600." If I read two $a$ and $b$ values on scale 46 of "600" and "400" respectively I rotate slider 39 until "40" of scale 39 is aligned with "60" of scale 37. Pointer 40 then indicates "500." The correct power in kilowatts is obtained by dividing this by ten, in other words it is 50 kilowatts.

Portable measuring apparatus of the character described, both direct current and alternating current types, are quite generally used in close proximity to current carrying conductors other than the one subject to measurement. Hence stray fields are apt to be present and it is also probable that such stray field conditions will vary greatly with different measurements made at different times and in different localities and by different persons. I have found that these stray flux field conditions produce measurement errors in this type of apparatus unless prevented. I have also found that the angle at which the core is held with respect to a cable being measured for current flow makes a difference in the measurement accuracy unless shielding precautions are taken. For example, the core 12', 14 of Fig. 6 may be hooked over a cable with the cable in the center of the loop and at right angles thereto or it may be hooked over a cable in the relative position of line 53, Fig. 6, where one part of the cable passes close to coil 41. An unshielded coil apparatus will give different results in these different conditions. The positioning of a cable within the core close to or far away from the coil makes some difference in the measurement if no shielding is present. Errors caused by these conditions have apparently gone unnoticed heretofore. In the Arey patent previously mentioned, it was explained how with the hook 14 open, as represented in dotted lines in Fig. 6, the core might be partially closed about a current carrying conductor to obtain a low trial reading on the ammeter to determine if it would be safe to close the core without overloading the measuring instrument. When the core is open in this manner, the apparatus is particularly susceptible to stray fields from current carrying wires in the vicinity and moreover the trial reading which is obtained varies considerably with the angle of the cable in the core opening, unless flux shielding features now to be described are provided.

In the form of apparatus shown in Fig. 6, I have found that a substantial improvement in accuracy under various conditions may be obtained by the use of magnetic shields about the coil 41 and the measuring instrument. In Fig. 6, I provide a magnetic shield 54 about coil 41. This shield is open at the top and bottom but completely encircles the coil 41 on all lateral sides and extends outside and about the legs of core part 12' and is suitably spaced therefrom. This shield thus surrounds that part of the transformer core which is associated with the measuring instrument. The insulating part of casing 11 may be moulded about the outside and inside of the shield to hold it in place with a tight fit. Stray fluxes which might otherwise find a path through the core 12' where it passes through the coil are largely diverted through the shield outside the coil. The measurement accuracy of the device is much more constant and stable under the various conditions mentioned above.

A magnetic shield is also placed completely about the measuring instrument and is preferably covered or enclosed in the insulating material of which the casing is made. The casing is broken away to show this shield at 55. This shield is a band or wide ring encircling the permanent magnet 56 and not only prevents stray fluxes from threading armature coil 43 but in addition prevents the permanent magnet from becoming demagnetized due to sudden flux changes in the vicinity of the instrument. This shielding arrangement is particularly beneficial where rectifier instruments are used because without it the rectifier acts as a half-wave short circuit path for currents due to stray $a$—$c$ fluxes picked up by coil 41, causing an unintentional instrument current.

The shields described are not a perfect cure-all for the conditions mentioned but do result in a marked improvement in consistent accuracy under all conditions. As shown in Fig. 6, the scale plate may now be provided with a graduation mark at 57 for the trial readings with core 14 open. If the trial reading goes above this mark, the pointer will go off scale when the core is closed. Without the shield 54 this trial reading is quite indefinite and misleading.

I also provide a mark 59 on the scale plate which is in line and exactly covered by pointer 21 when the latter is in the zero position and is in its original straight condition, as when calibrated. This mark is about midway between the ends of the pointer. It is preferably of the same width as the pointer and may be colored red if desired. When the pointer is not bent and is indicating zero on the scale, the mark is not seen since it is exactly covered by the pointer. However, if the pointer becomes bent in use, as by an overload condition, the bent condition is immediately revealed because then it is impossible for the pointer to indicate zero and still exactly cover the mark 59. This is a very useful expedient for instruments generally, as it is otherwise not easy to detect slightly bent pointers. A bent pointer may be readily set on zero without knowing that it is bent. If this is done the armature is obviously not in its original zero angularly rotary position and hence the calibration of the instrument is not corrected by merely setting a bent pointer at zero. In order to have the armature in its original zero calibration position with the pointer on zero, the pointer must be straight, if it was straight when the instrument was originally calibrated. Here, then, I have provided a very simple but highly desirable check on the instrument with respect to bent pointers and shafts and displaced pivots, since, if the pivot of the shaft is displaced for any reason or if the pointer is bent, the pointer will not line up with the mark 59 and still indicate zero. In place of a single mark the thickness of the pointer, I may merely draw the edges of such a mark. In this case, the mark would consist of two lines corresponding to and in alignment with the edges of the pointer when it is in its proper zero indicating condition. While such an expedient is applicable to instruments generally, it is particularly useful with a portable instrument that is apt to receive some unavoidable abuse and rough use.

In accordance with the provisions of the patent statutes, I have described the principle of operation of my invention together with the apparatus which I now consider to be representative embodiments thereof, but I desire to have it understood that the apparatus shown is only illustrative and that the invention may be carried out by other means.

What I claim as new and desire to secure by Letters Patent of the United States is:

1. A hook-on meter comprising a magnetic core having means for opening and closing the core in order that it may be closed about a current carrying conductor for current measuring purposes, a voltage measuring circuit including a winding on said core for voltage measuring purposes, and measuring instrument means for measuring the flux in said core in terms of current or voltage, said voltage winding circuit having such impedance and number of turns as to produce the same measurement response of said measuring instrument per volt applied to the voltage measuring circuit as is produced per ampere flowing in such conductor when measuring current.

2. A hook-on meter comprising a magnetic core having means for opening and closing the same for the purpose of closing the core about a conductor for current measuring purposes, a voltage measuring circuit including a winding on said core for voltage measuring purposes, a condenser included in said voltage measuring circuit for causing the power factor of such circuit to be unity, measuring instrument means for measuring the flux in said core in terms of current or voltage, said voltage measuring circuit having such resistance and such number of turns about the core as to produce the same measurement response of said instrument per volt applied to the voltage measuring circuit as is produced per ampere flowing in such conductor when measuring current.

3. A hook-on meter comprising a magnetic core having means for opening and closing the same for the purpose of coupling the core with a current carrying conductor for current measurements, a voltage measuring circuit including a winding on said core having a number of turns equal numerically to the impedance of the voltage measuring circuit and measuring instrument means for measuring the flux in said core in terms of amperes or volts.

4. A hook-on meter comprising a magnetic core having means for opening and closing the core for the purpose of coupling the core in transformer relation with a conductor for current measurement, a voltage winding circuit including a winding on said core, said winding having a number of turns equal numerically to the resistance of the voltage measuring circuit, a condenser in the voltage measuring circuit for causing said circuit to operate at unity power factor, and measuring instrument means for measuring the flux in said core in terms of amperes flowing in such conductor or volts applied to said voltage measuring circuit.

5. A hook-on meter comprising a magnetic core having means for opening and closing the core in order that it may be coupled in transformer relation with a conductor of a circuit for current measuring purposes, an electrical measuring instrument, a winding on said core from which said measuring instrument is energized, said winding serving as the secondary of a current transformer for current measurements, circuit completing means including said winding adapted to be connected across the circuit for voltage measuring purposes, said circuit completing means including sufficient impedance to produce the same measurement response of said instrument per volt applied to said circuit as is produced per ampere in such conductor when measuring current.

6. A hook-on meter, comprising a magnetic core having means for opening and closing the core for coupling it in transformer relation with a conductor of a circuit for current measuring purposes, an electrical measuring instrument, a winding on said core to which said instrument is connected, said winding acting as the secondary of a current transformer when measuring current, a voltage measuring circuit completing means including said winding and having terminals for connection across the circuit for voltage measuring purposes, said circuit completing means including a condenser for at least partially overcoming the inductive effect of said winding and a resistance for reducing the current flow in said circuit completing means to a point where current and voltage may be measured by said instrument on the same scale in terms of amperes and volts.

7. In combination with a power circuit, a metering device comprising a magnetic core member, means for producing a flux in said core member in a predetermined phase with and proportional to the current in amperes of said circuit, means for simultaneously producing a flux in said core member in said predetermined phase with and proportional to the voltage of said circuit, and a measuring part influenced by the resultant flux in said core member for producing a measurement proportional to the vector summation of the current and voltage fluxes in terms of the amperes and volts of said circuit and the phase angle between the current and voltage.

8. In combination with a power circuit, a metering device comprising a magnetic core member, current and voltage winding means on said core member, means for simultaneously energizing said winding means from and in phase with the current and voltage respectively of said power circuit, a measuring part influenced by and in proportion to the resultant flux in said core, and means for shifting the phase of the energizing current through one of the winding means in a known direction for determining, by the change, if any, in the measurement reading of said instrument means, whether the power factor of said circuit is leading or lagging or unity.

9. In combination with a power circuit, a magnetic core member, winding means for producing a flux in said core member in a predetermined phase with and proportional to the current flowing in said circuit, winding means for producing a flux in said core member in said predetermined phase with and proportional to the electromotive force of said circuit, measuring instrument means for measuring the flux of said core member, means for separately energizing the current and electromotive force winding means for the separate measurement of current and electromotive force and for simultaneously energizing said current and voltage winding means for measuring the vector summation of current and voltage fluxes.

10. Measuring apparatus for measuring different quantities of an electric circuit comprising a magnetic core member, measuring instrument means responsive to the flux in said core, a current winding and a voltage winding on said core and means for individually or simultaneously energizing said windings, said instrument means having a scale calibrated for the measurement of current when said current winding alone is energized, and for the measurement of electromotive force when said voltage winding alone is energized and a different scale calibrated to read $\frac{1}{4}(E^2+I^2 \pm 2EI \cos \phi)$ when both windings are energized simultaneously, where $I$ is the energizing current of the current winding, $E$ is the energizing electromotive force of the voltage winding, and $\phi$ is the phase angle between the current and electromotive force.

11. Measuring apparatus comprising a casing, a magnetic core supported by said casing, current and voltage winding circuit means for producing corresponding fluxes in said core proportional to the amperes in, and the volts across, the current and voltage winding circuit means respectively, a measuring instrument in said casing influenced by and in proportion to the flux in said core, means for separately or simultaneously energizing the current and voltage winding means, said instrument having a scale calibrated to indicate the amperes in the current winding circuit means when it is energized alone, and to indicate the volts in the voltage winding circuit means when it is energized alone, and means for relatively reversing the direction of current and voltage fluxes in said core in order that instrument readings proportional to the vector sum and the vector difference of the current and voltage fluxes may be obtained on said scale.

12. A measuring device that may be used for synchronizing systems comprising a magnetic core having voltage and current windings with connections such that before synchronizing the voltage winding is subjected to a voltage dependent upon phase difference of the voltages to be synchronized and after synchronizing the current winding is energized by the current flow between the synchronized systems, and a measuring instrument responsive to the energization of the windings for indicating such phase difference and current flow.

WILLIAM D. HALL.